(12) United States Patent
Van Antwerp et al.

(10) Patent No.: US 6,252,032 B1
(45) Date of Patent: Jun. 26, 2001

(54) UV ABSORBING POLYMER

(75) Inventors: William P. Van Antwerp, Valencia, CA (US); Li Yao, Fairburn, GA (US)

(73) Assignee: MiniMed Inc., Sylmar, CA (US)

( * ) Notice: Subject to any disclaimer, the term of this patent is extended or adjusted under 35 U.S.C. 154(b) by 0 days.

(21) Appl. No.: 09/349,270

(22) Filed: Jul. 7, 1999

(51) Int. Cl.$^7$ .................................................. C08G 18/30
(52) U.S. Cl. .................................. 528/73; 528/85; 522/2; 522/7; 522/63; 522/904; 522/905
(58) Field of Search ......................... 528/73, 85; 522/904, 522/905, 2, 7, 63

(56) References Cited

U.S. PATENT DOCUMENTS

| | | |
|---|---|---|
| 3,880,797 | 4/1975 | Maeda et al. . |
| 4,026,931 | 5/1977 | Wiesel et al. . |
| 4,199,489 * | 4/1980 | Short ....................................... 528/73 |
| 4,822,680 | 4/1989 | Catalano et al. ....................... 428/429 |
| 4,826,978 | 5/1989 | Migdal et al. ......................... 544/216 |
| 4,845,180 * | 7/1989 | Henry et al. ............................ 528/73 |
| 4,857,072 | 8/1989 | Narducy et al. .......................... 8/507 |
| 4,880,859 * | 11/1989 | Slongo et al. ........................... 524/91 |
| 5,376,650 | 12/1994 | Weaver et al. ......................... 525/154 |
| 5,391,250 | 2/1995 | Cheney, II et al. .................. 156/268 |
| 5,459,222 * | 10/1995 | Rodgers et al. ......................... 528/73 |
| 5,630,979 | 5/1997 | Welz et al. ............................ 264/400 |
| 5,777,060 | 7/1998 | Van Antwerp ........................ 528/28 |
| 6,031,044 * | 2/2000 | Kokel .................................. 524/839 |

* cited by examiner

Primary Examiner—Rachel Gorr
(74) Attorney, Agent, or Firm—Gates & Cooper LLP (57) ABSTRACT

An ultraviolet-absorbing polymer is formed from a reaction mixture including a diisocyanate, at least one selected from the group consisting of a diol, a diamine and mixtures thereof, and a polyfunctional UV-absorbing monomer.

26 Claims, 5 Drawing Sheets

UV ABSORBING POLYMER

FIELD OF THE INVENTION

The present invention relates to polymers having improved ultraviolet (UV) absorption. More specifically, the present invention relates to UV absorbing polymers suitable for use in a wide variety of applications, including the production of thin film electrochemical sensors of the type used, for example, in subcutaneous or transcutaneous monitoring of blood glucose levels in a diabetic patient, as well as contact lens coatings, drug delivery tubing, in situ curable implantible materials such as bioadhesives, nonadhesion coatings for use in surgery, etc.

BACKGROUND OF THE INVENTION

Polymers and polymeric material that include UV absorbers are known in a wide variety of applications. For example, U.S. Pat. No. 5,376,650, to Weaver et al., adentitled "Light Absorbing Polymers", discloses light-absorbing thermoplastic polymer compositions for imparting color and/or UV protection to thermoplastic resins. U.S. Pat. No. 4,668,739, to Berdahl et al., entitled "Poly(Phenylene Ether)-Bound UV Absorber", teaches stabilized polyphenylene ether resins incorporating UV absorbers, which are useful as high performance engineering thermoplastics in the production of films, fibers and molded articles. U.S. Pat. No. 5,385,815, to Schofield et al., entitled "Photographic Elements Containing Loaded Ultraviolet Absorbing Polymer Latex," describes polymers formed from ethylenically unsaturated monomers having pendent UV absorbers, which are useful in protecting silver halides in photographic elements from exposure to UV.

Figure 5:
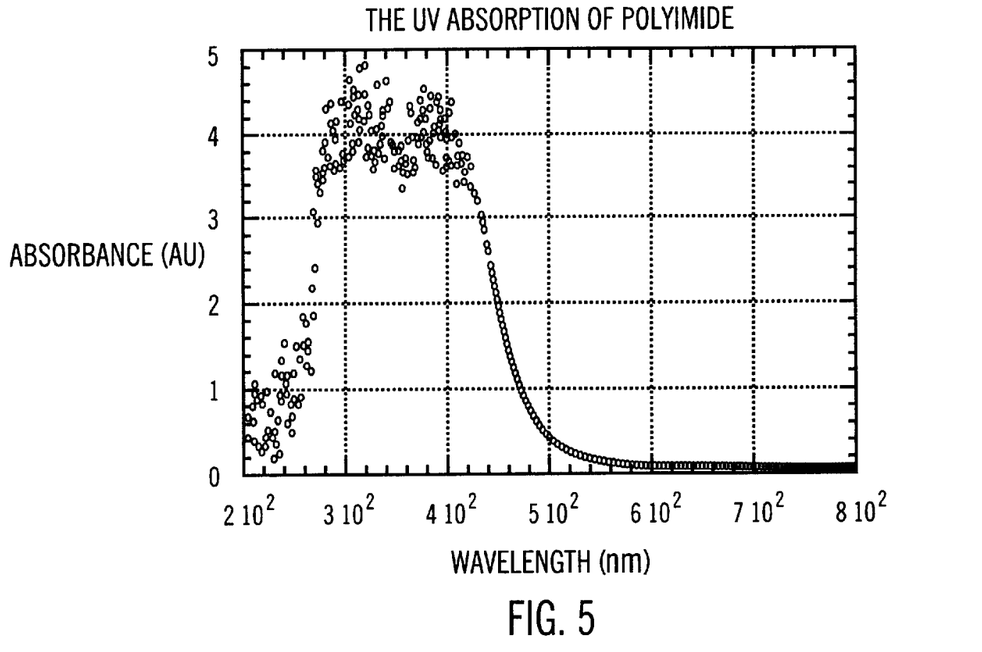
FIG. 5 is a graph of the UV absorption spectrum of polyimide, showing maximum absorption in the range of 300–400 nm.

Polyurethanes, polyureas and combined polyurethane/polyureas have been used in the production of biomedical devices, in particular devices, such as glucose sensors, which are implantable in a human patient. For example, U.S. Pat. No. 5,165,407, to Wilson et al., entitled "Implantable Glucose Sensor", teaches a glucose sensor which is fabricated using a polyurethane coating layer. In certain known manufacturing processes for the production of such sensors, the sensors are produced by sequential buildup of the sensor layers on a substrate. The completed sensors are finally removed from the substrate by use of a laser, which cuts the sensors from the remaining laminate atop the substrate. Known polyurethanes, however, are substantially transparent at the laser wavelengths typically employed (355 nm, in the ultraviolet region of the spectrum), unlike other polymers, such as polyimide (the UV absorption spectrum of which is shown in FIG. 5), which also form layers of the laminate. This substantial transparency results in processing difficulties.

A need exists for a polymer that is strongly UV absorbent. A need also exists for a polymer, in particular a polyurethane, polyurea or polyurethane/polyurea copolymer, that absorb UV in the same range as other polymers, such as polyimides, that are used in the production of thin film sensors. More specifically, a need exists for a polymer that absorbs UV in the 355 nm range.

A need also exists for a UV-absorbing polymer that is biocompatible, in order to permit use in the production of implantable sensors such as blood glucose sensors.

SUMMARY OF THE PREFERRED EMBODIMENTS

In accordance with one aspect of the present invention, there is provided a UV-absorbing polymer formed from a reaction mixture including a diisocyanate, at least one selected from the group consisting of a diol, a diamine and mixtures thereof, and a polyfunctional UV-absorbing monomer. The inventive polymer is a polyurethane, a polyurea or a polyurethane/polyurea copolymer that strongly absorbs UV, more particularly at 355 nm.

Preferred UV-absorbing monomers which are incorporated in the inventive polymers include biocompatible UV-absorbers, in particular vitamin $B_2$ and vitamin $B_6$.

A plurality of different polyfunctional UV-absorbing monomers, each of which has a different UV absorption range, are used in a preferred embodiment of the inventive polymer.

In a preferred embodiment, the inventive polymers also incorporate a siloxane polymer with terminal functional groups that are reactive with isocyanate.

According to another aspect of the present invention, there is provided a method for producing a polymer as described herein. The method includes the steps of reacting a diisocyanate with a polyfunctional UV-absorbing monomer to form an oligomer, then reacting the oligomer with at least one selected from the group consisting of a diol, a diamine and mixtures thereof.

According to a further aspect of the present invention, there is provided a method for producing a polymer as described herein that includes the steps of reacting a diisocyanate with a polyfunctional UV-absorbing monomer to form a first oligomer, reacting the first oligomer with at least one polyol to form a second oligomer, and reacting the second oligomer with at least one chain extender selected from the group consisting of a diol, a diamine and mixtures thereof.

In still another aspect of the present invention, a method of producing a polymer as described herein includes the steps of reacting a diisocyanate with at least one polyol to form a first oligomer, reacting the first oligomer with a polyfunctional UV-absorbing monomer to form a second oligomer, and reacting the second oligomer with at least one chain extender selected from the group consisting of a diol, a diamine and mixtures thereof.

According to yet another aspect of the present invention, a method of producing a polymer as described herein includes the steps of combining a diisocyanate with a polyflnctional UV-absorbing monomer and at least one polyol to form a reaction mixture, and curing the reaction mixture.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

DETAILED DESCRIPTION OF THE PREFERRED EMBODIMENTS

The inventive polymers are characterized by excellent UV absorption, in particular in the 355 nm range. For the purposes of the invention, a polymer "strongly absorbs UV at 355 nm" if a 4 to 8 mm thick membrane formed from the polymer has a UV absorption of at least about 0.4 Absorbance Unit (AU), more preferably 0.4 to 1.0 AU.

Preferred embodiments of the inventive polymer are also characterized by low cytotoxicity. The inventive polymers are particularly useful in fabricating sensors, in particular biosensors such as glucose sensors, and are beneficially employed in the methods described in co-pending U.S. patent application Ser. No. 09/348,771 (attorney docket no. PD-0328), entitled "Sensor Including UV-Absorbing Polymer and Method of Manufacture", filed simultaneously herewith and incorporated herein in its entirety by reference.

Useful diisocyanates for producing polymers according to the invention include, without limitation, those described in U.S. Pat. No. 5,786,439, to Van Antwerp et al., entitled "Hydrophilic, Swellable Coatings for Biosensors," which is incorporated herein in its entirety by reference. Such diisocyanates are typically used in the preparation of biocompatible polyurethanes (see in this regard Szycher, "Seminar on Advances in Medical Grade Polyurethanes", Technomic Publishing, (1995)) and include both aliphatic and aromatic diisocyanates. Suitable aliphatic diisocyanates include, for example, 4,4'-methylenebis(cyclohexylisocyanate) (H12MDI), 1,6-hexamethylene diisocyanate (HDI), trimethylhexamethylene diisocyanate (TMDI), trans-1,4-cyclohexane diisocyanate (CHDI), 1,4-cyclohexane bis (methylene isocyanate) (BDI), 1,3-cyclohexane bis (methylene isocyanate) (H6XDI), and isophorone diisocyanate (IPDI). Examples of suitable aromatic diisocyanates include toluene diisocyanate, 4,4'-diphenylmethane diisocyanate, 3,3'-dimethyl-4,4'-biphenyl diisocyanate, naphthalene diisocyanate and paraphenylene diisocyanate. In preferred embodiments, the diisocyanate is an aliphatic diisocyanate, more preferably 4,4'-methylenebis(cyclohexyl isocyanate), isophorone diisocyanate or 1,6-hexamethylene diisocyanate. A number of these diisocyanates are available from commercial sources such as Aldrich Chemical Company (Milwaukee, Wis., USA) or can be readily prepared by standard synthetic methods using literature procedures.

Figure 4:
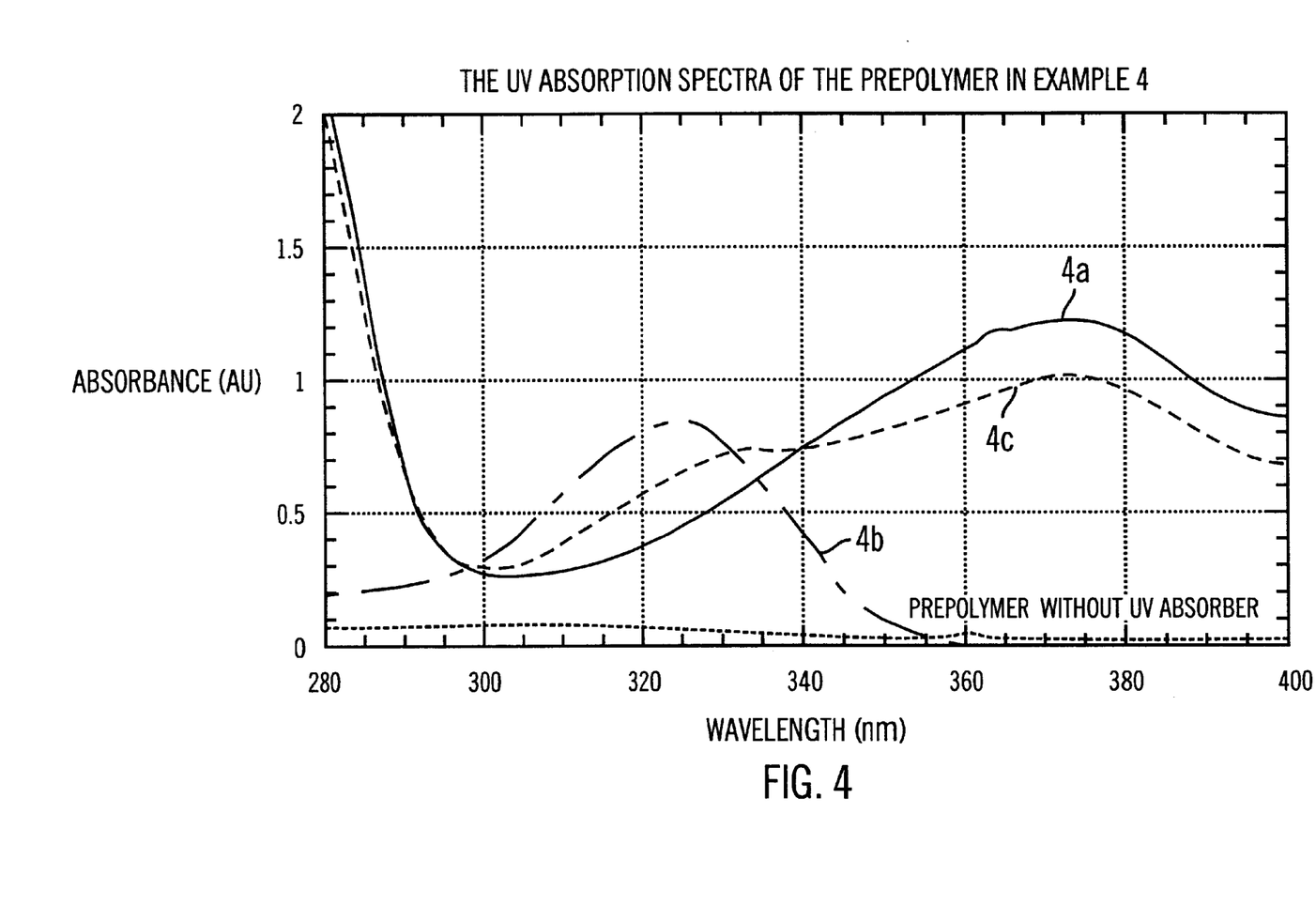

Diols that are useful according to the invention include, without limitation, poly(alkylene)glycols, polyester-based polyols, and polycarbonate polyols, such as those described in U.S. Pat. No. 5,777,060, to Van Antwerp, entitled "Silicon-Containing Biocompatible Membranes," which is incorporated herein in its entirety by reference. As used herein, the term "poly(alkylene)glycol" refers to polymers of lower alkylene glycols such as poly(ethylene)glycol, poly(propylene)glycol and polytetramethylene ether glycol (PTMEG). The term "polyester-based polyol" refers to a polymer as depicted in FIG. 4 of U.S. Pat. No. 5,777,060 in which the R group is a lower alkylene group such as ethylene, 1,3-propylene, 1,2-propylene, 1,4-butylene, 2,2-dimethyl-1,3-propylene, and the like. One of skill in the art will also understand that the diester portion of the polymer can also vary from the six-carbon diacid shown. For example, while FIG. 4 of U.S. Pat. No. 5,777,060 illustrates an adipic acid component, the present invention also contemplates the use of succinic acid esters, glutaric acid esters and the like. The term "polycarbonate polyol" refers those polymers having hydroxyl functionality at the chain termini and ether and carbonate functionality within the polymer chain. The alkyl portion of the polymer will typically be composed of $C_2$ to $C_4$ aliphatic radicals, or in some embodiments, longer chain aliphatic radicals, cycloaliphatic radicals or aromatic radicals.

Diamines that are useful according to the invention include, without limitation, compounds corresponding to the foregoing diols in which the terminal hydroxyl groups have been replaced by reactive amine groups or in which the terminal hydroxyl groups have been derivatized to produce an extended chain having terminal amine groups. For example, a preferred hydrophilic diamine is a "diamino poly(oxyalkylene)" which is poly(alkylene)glycol in which the terminal hydroxyl groups are replaced with amino groups. The term "diamino poly(oxyalkylene" also refers to poly(alkylene)glycols which have aminoalkyl ether groups at the chain termini. One example of a suitable diamino poly(oxyalkylene) is poly(propylene glycol)bis(2-aminopropyl ether). A number of the above polymers can be obtained from Aldrich Chemical Company. Alternatively, literature methods can be employed for their synthesis.

The inventive polymers are produced using polyfunctional monomers that include UV absorbing moieties. As used herein, "polyfanctional" monomers include monomers having at least two functional groups that are reactive with isocyanates, i.e., difunctional or higher monomers. The inventive polymers preferably include the UV absorbing moieties as pendent groups, but can also incorporate the UV absorbing moieties directly into the main chain of the inventive polymers.

Preferably, the UV absorbing moieties are biocompatible, so that the resultant UV absorbing polymers can be used in the production of biosensors, in particular implantible biosensors, as well as other devices that come into contact with human and animal tissues and body fluids. However, non-biocompatible UV absorbers can also be used to produce polymers that are not intended for applications where biocompatibility is required.

Particularly preferred polyfunctional monomers having UV absorbing moieties include vitamin $B_2$ (riboflavin), which strongly absorbs UV in the range 266–371 nm, and vitamin $B_6$ (pyridoxine), which has broad UV absorption peaks at 255 nm, 291 nm and 326 nm. Both vitamin $B_2$ and vitamin $B_6$ are biocompatible and include pluralities of hydroxyl groups which are reactive with isocyanates. When vitamin $B_2$ is used, the UV-absorbing moiety is pendent from the main chain of the polymer. When vitamin $B_6$ is used, the UV-absorbing moiety is incorporated into the main chain of the polymer.

Additional biocompatible UV absorbers that are useful in the present invention include, without limitation, benzotriazole-based absorbers, such as 2,2'-dihydroxy-3-(2H-benzotriazol-2-yl)-3'-(4, 6-diphenyl-s-triazin-2-yl)-5-methyl-6'-hexyloxy-diphenylmethane, 2,2'-dihydroxy-3-(2H-benzotriazol-2-yl)-3'-(4, 6-diphenyl-s-triazin-2-yl)-5-tert-octyl-6'-hexyloxy-diphenylmethane, etc., and benzophenone-based absorbers, such as 2-hydroxy-4-alkoxybenzophenone, 5,5'-methylene-bis(2-hydroxy-4-alkoxy-benzophenone) etc.

Non-biocompatible UV absorbers that are useful according to the invention include, without limitation, copper phosphates, such as $6CuO.P_2O_5.3H_2O$, $Cu_3(PO_4)_2.3Cu(OH)_2, 5CuO.P_2O_5.3H_2O$, $Cu_3(PO_4)_2.2Cu(OH)_2.H_2O$, 4CuO.P$_2$O$_5$,4CuO.P$_2$O$_5$.3H$_2$O, 4CuO.P$_2$O$_5$.1.5H$_2$O, 4CuO.P$_2$O$_5$.1.2H$_2$O, and triazine compounds such as 2,4-bis[2-hydroxy-4-(2-hydroxyethoxy)-phenyl]-6-(4-chlorophenyl)-1, 3,5-triazine, 2,4-bis(2,4-dihydroxyphenyl)-6-(4-chlorophenyl)-1,3,5-triazine, etc.

Combinations of two or more UV absorbing moieties are especially useful in affording a broadened range of UV absorption.

In a preferred embodiment, the inventive polymers also incorporate siloxane units. Siloxane units are incorporated by including in the reaction mixture one or more siloxane polymers having terminal functional groups, such as —OH or —NH$_2$. Exemplary siloxane polymers that are useful according to the invention are described in U.S. Pat. No. 5,777,060, and include, polydimethylsiloxanes such as those illustrated in FIG. 5 therein. In some embodiments, combinations of silicone polymers can be used in which a first portion comprises hydroxyl groups and a second portion comprises amino groups. Preferably, the functional groups are positioned at the chain termini of the silicone polymers. A number of suitable silicone polymers are commercially available from such sources as Dow Chemical Company (Midland, Mich., USA) and General Electric Company (Silicones Division, Schenectady, N.Y., USA). Still others can be prepared by general synthetic methods as illustrated in FIGS. 6 and 7 of U.S. Pat. No. 5,777,060, beginning with commercially available siloxanes (United Chemical Technologies, Bristol. Pa., USA).

The molar ratio of diisocyanate:diol/diamine (with optional siloxane(s)) in the reaction mixture used to prepare the inventive polymers preferably ranges from about 100:98 to about 100:90, more preferably 100:90 to 100:95. When a mixture of diols and diamines is used, preferably a smaller amount of diamines (which act as chain extenders) is used. The molar ratio of diols to diamines preferably ranges from about 90:10 to about 50:50, more preferably about 80:20 to about 60:40, very preferably about 70:30.

The amount of UV absorbing monomer(s) is preferably about 0.1 wt % to about 1.0 wt %, based on the non-volatile components of the reaction mixture, more preferably about 0.1 wt % to 0.3 wt %. A higher percentage results in greater cross-linking, yielding a stiffer and more brittle polymer.

The inventive polymers are used with particular advantage in fabricating biosensors, specifically as coatings for biosensors such as glucose sensors. For example, the inventive polymers can be used in the fabrication processes described in U.S. Pat. Nos. 5,391,250; 5,390,671, to Lord et al., entitled "Transcutaneous Sensor Insertion Set"; U.S. Pat. No. 5,165,407, to Wilson et al., entitled "Implantable Glucose Sensor"; and U.S. Pat. No. 4,890,620, to Gough, entitled "Two-Dimensional Diffusion Glucose Substrate Sensing Electrode", which are incorporated herein in their entireties by reference. The inventive polymers also facilitate manufacturing methods that employ laser cutting, in particular cutting using lasers tuned to frequencies in the UV portion of the spectrum.

The invention is further illustrated by means of the following non-limiting examples. Example 1 provides the synthesis of polysiloxane-based polyurethanes that incorporate Vitamin B$_2$, Vitamin B$_6$, or mixtures thereof as UV absorbers. Example 2 provides the synthesis of mixed polyol-based polyurethanes that incorporate the vitamin UV absorbers mentioned above. Example 3 provides the synthesis of hydrophilic polyurethanes incorporating the vitamin UV absorbers. Example 4 provides the synthesis of precursors of vitamin-based polyurethane elastomers that are moisture-curable. Example 5 provides the synthesis of precursors of vitamin-based polyurethane elastomers that are UV-curable.

The aminopropyldimethyl-terminated polydimethylsiloxane (PS 510) used in Example 1 was obtained from United Chemical Technologies, Inc., Bristol, Pa., USA. The remaining materials used in the examples were obtained from Aldrich Chemical Co., Milwaukee, Wis., USA. Before use, the diisocyanates were purified by low-pressure distillation. The polyols and the chain extenders were dried by azeotropic drying. The vitamins were dried in a vacuum oven at 60° C. for 3 days. The tin catalyst was used as received without further treatment. Useful solvents include tetrahydrofuran (THF), dimethyl acetamide (DMAc), or dimethylformamide (DMF) which should be freshly distilled before use.

EXAMPLE 1

The following three reaction mixtures were prepared:

|  | 1a | 1b | 1c |
| --- | --- | --- | --- |
| 4,4'-methylenebis (cyclohexylisocyanate) | 2.94 g | 2.94 g | 2.94 g |
| dibutyltin bis(ethylhexanoate) | 30 mg | 30 mg | 30 mg |
| dry vitamin B$_2$ (riboflavin) | 5 mg | — | 2.5 mg |
| dry vitamin B$_6$ (pyridoxine) | — | 5 mg | 2.5 mg |

Each mixture was combined and placed in a reaction flask. The reaction flask was gently warmed to 30–40° C. under a nitrogen atmosphere using a heating mantle with a temperature indicator. Meanwhile, 65 ml of distilled tetrahydrofuran (THF) was added to each reaction mixture to form a uniform solution. Then the flasks were heated to 60° C. with a constant stirring rate. After 3 hours' stirring under nitrogen, a transparent light-yellow solution was formed in each flask.

Meanwhile, poly(propylene glycol-b-ethylene-b-propylene glycol)bis(2-aminopropyl ether) (Jeffamine 600) ($M_w$=600, 5.04 g) and aminopropyldimethyl-terminated polydimethylsiloxane (PS 510) ($M_w$=2500, 7.01 g) were combined and added into the stirring reaction flasks slowly using syringes. After the addition was completed, the solutions were refluxed at 65° C. for 2 hours, during which the mixtures became viscous. After cooling, 10 g of isopropanol was added into each solution to terminate the residue isocyanate group, then the mixture was poured into 3 L of rapidly stirring deionized (DI) water. The precipitated polymer was collected, torn into small pieces, and boiled in DI water. The boiling water was changed every half hour in order to leach out the unreacted vitamins. Meanwhile, the boiling DI water was sampled every half hour and tested by UV spectroscopy in order to detect any continued vitamin leaching. After leaching was substantially eliminated, the polymers were filtered out and dried at 60° C. in a vacuum oven until constant weight was obtained.

UV absorption was determined using a UV-Visible Spectrophotometer. Coatings were prepared by 3×spin coating of 6.8 wt % polymer THF solution on a glass plate at 1000 rpm to afford a 4 mm thick coating, measured by electron microscopy and ellipsometry. The following UV absorption peaks were observed:

| Polymer | UV absorption $l_{max}$ (nm) |
|---|---|
| 1a | 266, 371, 444 |
| 1b | 255, 326 |
| 1c | 250–270, 320–340, 350–380 |

Figure 1:
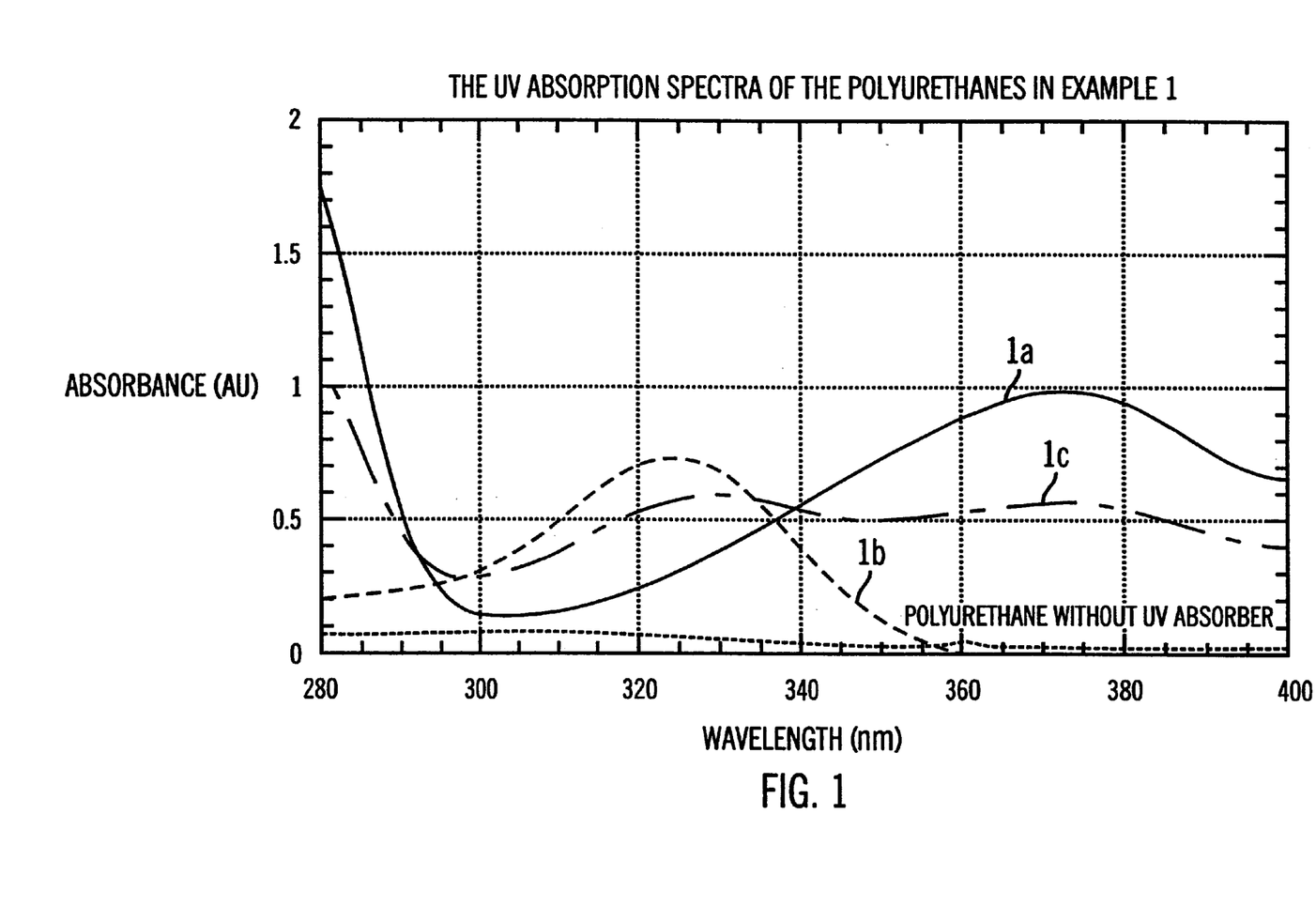
FIG. 1 is a graph of the UV absorption spectra of the inventive polymers prepared according to Example 1 herein.

The quantity of UV absorption at the specified wavelengths is shown in FIG. 1.

Use of a combination of two UV absorbers afforded a wide range of UV absorption.

In the foregoing example, it is important that the vitamin $B_2$ (riboflavin) and/or vitamin $B_6$ (pyridoxine) react substantially completely with the diisocyanate, before reacting with the other components. Compared with the reactivity of the amine end groups of the Jeffamine 600 and the PS 510, the reactivity of the hydroxyl end groups of the vitamins is low. The initial 3 hours' reaction ensures that substantially all of the vitamin(s) react with the diisocyanate in the presence of the catalyst. Completion of this reaction is indicated by the formation of the transparent light yellow solution. However, excessive initial reaction can generate an undesirable degree of crosslinking, which will decrease the solubility of the polyurethane in solvents such as THF or isopropanol. In order to avoid such crosslinking, it is important to keep the initial reaction temperature low (60° C.) and to keep the initial reaction time short (3 hours).

The quantity of UV absorber(s) used in preparing the inventive polymers will be determined by factors including the desired absorption, the thickness of the film to be formed from the polymers, and the maximum desired intrinsic viscosity (which is indicative of the extent of crosslinking). In formulation 1a above, use of 5 mg of riboflavin affords an intrinsic viscosity of 47 ml/g, which is comparable to the intrinsic viscosity of the corresponding polymer without the inclusion of riboflavin (42–48 mg/l), while still affording advantageous UV absorption.

The cytotoxicity of the inventive polymers was evaluated as follows. A sample of each polymer was leached in minimal growth medium for 24 hours. The test samples were then removed and the solvent solutions were reserved. Cell monolayers of L-929 mouse fibroblasts were grown to confluency, and the cell media were then aspirated and replaced with the solvent solutions. After incubation at 37° C. for 48 hours, no cell lysis was observed, and all intracytoplasmic granules remained discrete, indicating that the polymers were non-cytotoxic.

EXAMPLE 2

The following three reaction mixtures were prepared:

|  | 2a | 2b | 2c |
|---|---|---|---|
| Isophorone diisocyanate | 2.49 g | 2.49 g | 2.49 g |
| dibutyltin bis(ethylhexanoate) | 30 mg | 30 mg | 30 mg |
| dry vitamin $B_2$ (riboflavin) | 5 mg | — | 2.5 mg |
| dry vitamin $B_6$ (pyridoxine) | — | 5 mg | 2.5 mg |

Each mixture was combined and fed to a reaction flask. Under nitrogen, the reaction flasks were gently warmed using a heating mantle with temperature indicator (to 30–40° C.). Meanwhile, 65 ml of distilled tetrahydrofuran (THF) was added to each flask to form an uniform solution. After 3 hours' stirring under nitrogen, a transparent, light-yellow solutions were formed. Next, a mixture of polyethylene glycol (PEG 600) ($M_w$=600; 2.52 g)/polyoxytetramethylene diol (TERATHANE 650) ($M_w$=650; 2.73 g) was added into the stirring reaction flasks slowly by syringes. After continuing the refluxing for another 2 hours, butanediol (0.25 g), as a chain extender, was added to the solutions slowly by syringe. The solutions were refluxed (60–65° C.) for 12 hours. The synthesized polyurethanes were separated following the same procedure as Example 1.

UV absorption was determined using a UV-visible spectrophotometer. Coatings were prepared by 3×spin coating of 6.8 wt % polymer-TBF solution on a glass plate at 1000 rpm to afford a 6 mm thick coating, measured by electron microscopy and ellipsometry. The following UV absorption peaks were observed:

| Polymer | UV absorption $l_{max}$ (nm) |
|---|---|
| 2a | 268, 374, 448 |
| 2b | 260, 325 |
| 2c | 250–270, 320–345, 350–380 |

Figure 2:
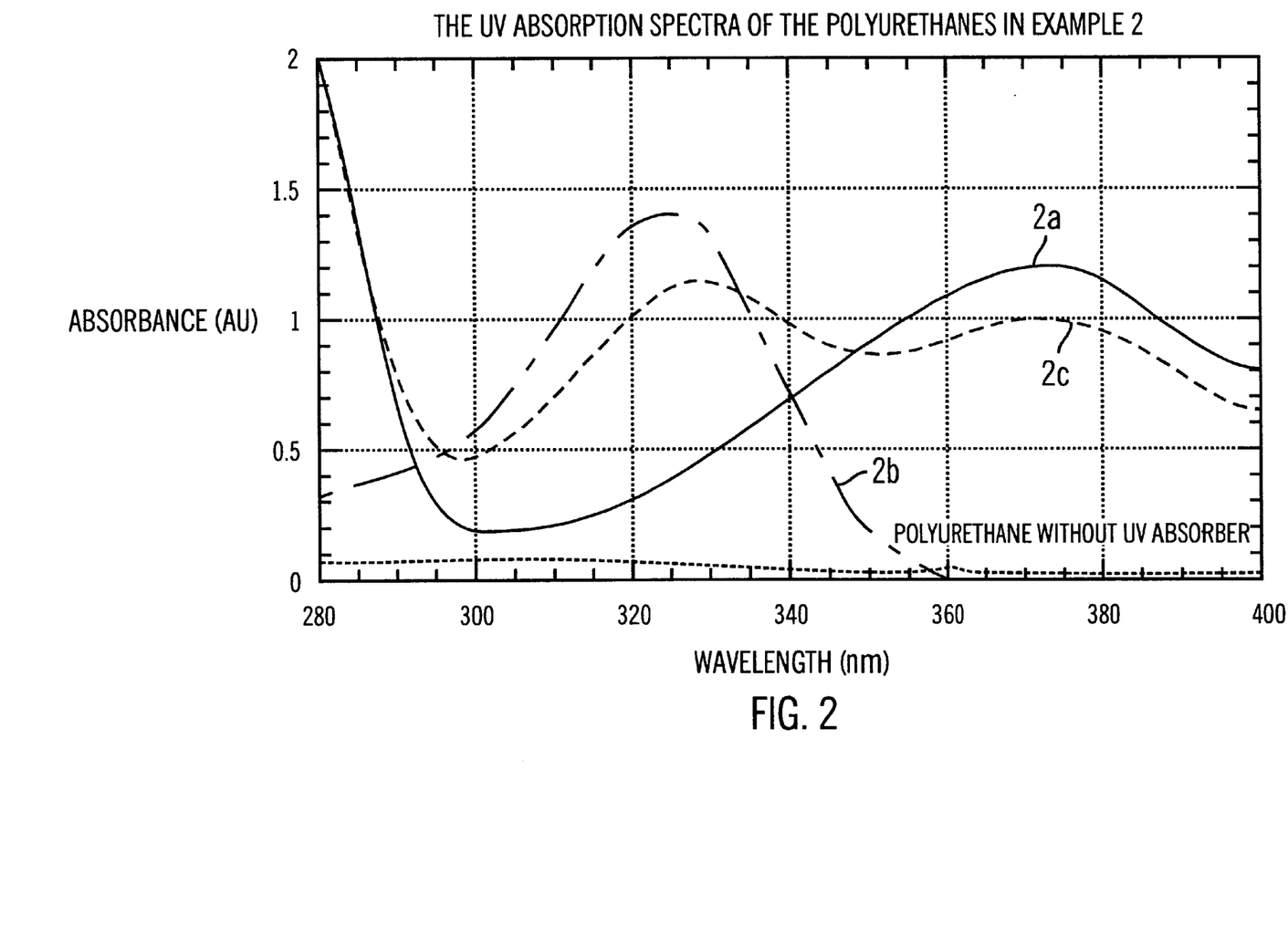
FIGS. 2–4 are graphs of UV absorption spectra of the inventive polymers prepared according to Examples 2–4 herein.

The quantity of UV absorption at the specified wavelengths is shown in FIG. 2.

EXAMPLE 3

The following three reaction mixtures were prepared:

|  | 3a | 3b | 3c |
|---|---|---|---|
| Polyethylene glycol (PEG 8,000) ($M_w$ = 8,000) | 22.4 g | 22.4 g | 22.4 g |
| TERATHANE 650 ($M_w$ = 650) | 1.82 g | 1.82 g | 1.82 g |
| dry vitamin $B_2$ (riboflavin) | 5 mg | — | 2.5 mg |
| dry vitamin $B_6$ (pyridoxine) | — | 5 mg | 2.5 mg |

Each mix was placed in a reaction flask, and the flasks were heated to about 70° C. under nitrogen. After all of the solids were molten, 4,4'methylenebis(cyclohexylisocyanate) (2.94 g) and dibutyltin bis(ethylhexanoate) (30 mg) were added to the flasks. At the same time, a stirrer was started in each flask and the reaction temperature was kept at approximately 75° C. After 3 hours' reaction, 65 ml of distilled dimethyl acetamide (DMAc) was added to the reaction flasks, and the solutions were refluxed until transparent solutions were formed. Then, 0.63 gram of 1–2, diaminocyclohexane was added to each flask dropwise. After a viscous solution was formed in each flask, the synthesized hydrophilic polyurethane/urea was separated. The procedure for the separation is the same as Example 1.

UV absorption was determined using a UV-visible spectrophotometer. Coatings were prepared by 3×spin coating of 6.8 wt % polymer-THF solution on a glass plate at 1000 rpm to afford an 8 mm thick coating, measured by electron microscopy and ellipsometry. The following UV absorption peaks were observed:

| Polymer | UV absorption $l_{max}$ (nm) |
|---|---|
| 3a | 268, 374, 446 |
| 3b | 255, 322 |
| 3c | 250–270, 320–340, 350–380 |

Figure 3:
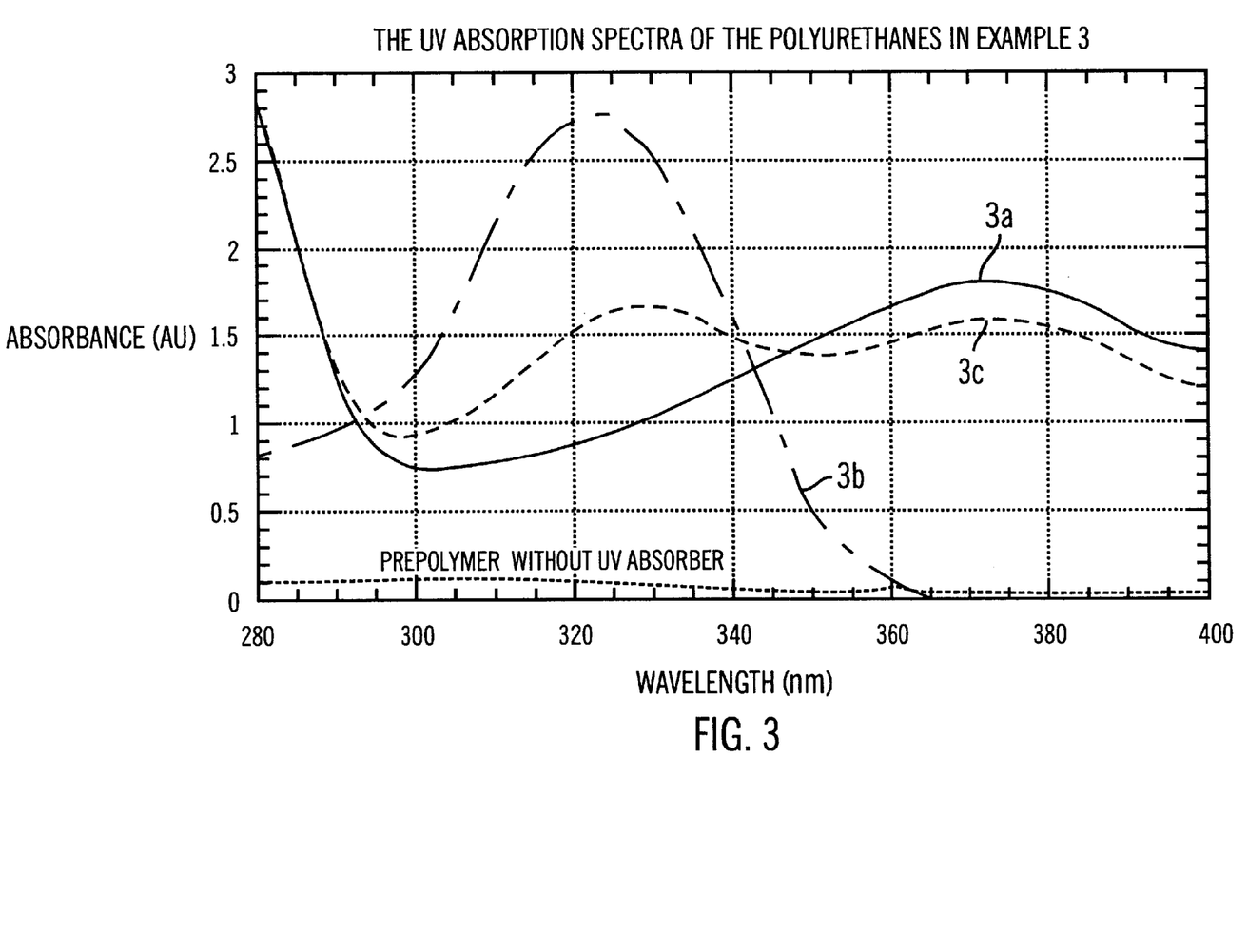

The quantity of UV absorption at the specified wavelengths is shown in FIG. 3.

EXAMPLE 4

Moisture Curable Thermoplastic Polyurethane

The following three reaction mixtures were prepared:

|  | 4a | 4b | 4c |
|---|---|---|---|
| polyethylene glycol (PEG 600) ($M_W$ = 600) | 12 g | 12 g | 12 g |
| polyoxytetramethylene diol (PTMG 1000) ($M_W$ = 1,000) | 12 g | 12 g | 12 g |
| 4,4'-methylenebis (cyclohexylisocyanate) | 9.45 g | 9.45 g | 9.45 g |
| dibutyltin bis(ethylhexanoate) | 30 mg | 30 mg | 30 mg |
| dry vitamin $B_2$ (riboflavin) | 10 mg | — | 5 mg |
| dry vitamin $B_6$ (pyridoxine) | — | 10 mg | 5 mg |

The mixtures were heated to 85° C. under nitrogen and maintained at this temperature until the isocyanate concentration dropped to 2.5%. The isocyanate concentration was detected by either titration or FTIR spectrum. Ethylene glycol was used to adjust the isocyanate concentration if it was higher than 2.5%. The reaction mixtures were then cooled in an ice bath in order to quench the reactions, then 2 g of a latent hardener (oxazolindine) was added. (Other hardeners, such as ketamine or enamine, can also be used.) The resulting prepolymers were transparent gels with a viscosity of 33.2 Pascal seconds.

The UV absorption spectrum of the foregoing prepolymers is shown in FIG. 4.

The prepolymers can be used in the fabrication of biosensors. For example, the prepolymers can be applied directly onto the surface of a sensor plate, then cured by exposure to atmospheric moisture. In this way, use of hazardous solvents can be avoided when the prepolymer is applied.

The prepolymers can also be used, for example, as a moisture curable UV screening coating material for application to contact lenses, drug delivery tubing with UV protection, etc.

EXAMPLE 5

Moisture Curable Thermoplastic Polyurethane

The following three reaction mixtures were prepared:

|  | 5a | 5b | 5c |
|---|---|---|---|
| polyethylene glycol (PEG 1000) ($M_W$ = 1000) | 3.36 g | 3.36 g | 3.36 g |
| 4,4'-methylenebis (cyclohexylisocyanate) | 2.94 g | 2.94 g | 2.94 g |
| dibutyltin bis(ethylhexanoate) | 30 mg | 30 mg | 30 mg |
| dry vitamin $B_2$ (riboflavin) | 10 mg | — | 5 mg |
| dry vitamin $B_6$ (pyridoxine) | — | 10 mg | 5 mg |

The mixtures were fed into aluminum foil-covered flasks and heated to 60° C. under nitrogen. After 4 hours' stirring, the isocyanate concentration became constant based on FTIR detecting. Then 2-hydroxyethyl methacrylate (0.87 g) was added to each flask, and the reactions were kept at 40° C. with the protection of nitrogen. After 4 hours' reaction, a photoinitiator (a combination of ethyl eosin ($10^{-4}$ to $10^{-2}$ M) and triethanol amine (0.001 to 0.1 M)) were added (the selected chemicals serve as photoinitiators for UV radiation at 355 nm, and are non-cytotoxic, with a high free radical generation rate). Other photoinitiators, such as 2,2-dimethoxy-2-phenylacetophenone ($10^{-4}$ to $10^{-2}$ M) can also be used. The resulting prepolymers were opaque with a viscosity of 44.3 Pascal seconds.

The foregoing prepolymers can be used in sensor fabrication by direct application to the surface of a sensor plate, followed by curing using a UV lamp. Since the prepolymers have strong UV absorption, the curing time is on the order of 30 seconds. As with the prepolymers of Example 4, use of solvents is avoided.

The prepolymers can also be used in other applications, such as in situ curable implantible materials, such as bioadhesives, nonadhesion coatings for use in surgery, etc. Unlike other UV curable materials, the prepolymers have the advantages of high curing rate and low toxicity.

What is claimed is:

1. A UV-absorbing polymer formed from a reaction mixture comprising:
    a) a diisocyanate,
    b) at least one selected from the group consisting of a diol, a diamine and mixtures thereof, and
    c) a polyfunctional UV-absorbing monomer selected from the group consisting of vitamin $B_2$ and vitamin $B_6$.

2. The polymer of claim 1 wherein said polyfunctional UV-absorbing monomer comprises a pendent UV-absorbing moiety.

3. The polymer of claim 1 wherein said polyfunctional UV-absorbing monomer comprises a UV-absorbing moiety within the main chain of the monomer.

4. The polymer of claim 1 wherein said polyfunctional UV-absorbing monomer is biocompatible.

5. The polymer of claim 1 which is formed from a reaction mixture comprising a plurality of polyfunctional UV-absorbing monomers each of which has a different UV absorption range.

6. The polymer of claim 1 wherein said disocyanate is selected from the group consisting of 4,4'-methylenebis (cyclohexylisocyanate) and isophorone diisocyanate.

7. The polymer of claim 1 wherein said ingredient (b) is hydrophilic.

8. The polymer of claim 1 wherein said ingredient (b) is a block copolymer.

9. The polymer of claim 1 wherein said ingredient (b) is a diol.

10. The polymer of claim 9 wherein said diol is selected from the group consisting of poly(alkylene) glycols, polyester-based polyols and polycarbonate glycols.

11. The polymer of claim 9 wherein said diol is selected from the group consisting of polyethylene glycols, polypropylene glycols and polytetramethylene ether glycols.

12. The polymer of claim 1 wherein said ingredient (b) is a diamine.

13. The polymer of claim 12 wherein said diamine is selected from the group consisting of diamino poly (oxyalkylene)s and polypropylene glycol-b-ethylene glycol-b-propylene glycol)bis(2-aminopropyl ether).

14. The polymer of claim 1 further comprising (d) a siloxane polymer with terminal functional groups that are reactive with isocyanate.

15. The polymer of claim 1 which has a UV absorption at 355 nm of at least 0.4 AU based on a thickness of 4 to 8 mm.

16. The polymer of claim 15 which has a UV absorption between 0.4 and 1.0 AU.

17. A method of producing a UV-absorptive polymer that comprises the steps of
    (a) reacting a diisocyanate with a polyfunctional UV-absorbing monomer selected from the group consisting of vitamin $B_2$ and vitamin $B_6$ to form an oligomer, and (b) reacting said oligomer with at least one selected from the group consisting of a diol, a diamine and mixtures thereof.

18. The method of claim 17 wherein in step (b) a siloxane-containing polymer is reacted with said oligomer and said at least one diol, diamine or mixture thereof.

19. A method of producing a UV-absorptive polymer that comprises the steps of
  (a) reacting a diisocyanate with a polyfunctional UV-absorbing monomer selected from the group consisting of vitamin $B_2$ and vitamin $B_6$ to form a first oligomer,
  (b) reacting said first oligomer with at least one polyol to form a second oligomer, and
  (c) reacting said second oligomer with at least one chain extender selected from the group consisting of a diol, a diamine and mixtures thereof.

20. The method of claim 19, wherein in step (c) a siloxane-containing polymer is reacted with said second oligomer and said at least one diol, diamine or mixture thereof.

21. A method of producing a UV-absorptive polymer that comprises the steps of
  (a) reacting a diisocyanate with at least one polyol to form a first oligomer,
  (b) reacting said first oligomer with a polyfunctional UV-absorbing monomer selected from the group consisting of vitamin $B_2$ and vitamin $B_6$ to form a second oligomer, and
  (c) reacting said second oligomer with at least one chain extender selected from the group consisting of a diol, a diamine and mixtures thereof.

22. The method of claim 21 wherein in step (c) a siloxane-containing polymer is reacted with said second oligomer and said at least one diol, diamine or mixture thereof.

23. A method of producing a UV-absorptive polymer that comprises the steps of:
  (a) combining a diisocyanate with a polyfunctional UV-absorbing monomer selected from the group consisting of vitamin $B_2$ and vitamin $B_6$ and at least one polyol to form a reaction mixture, and
  (b) curing said reaction mixture.

24. The method of claim 23 wherein said reaction mixture is cured by exposure to UV.

25. The method of claim 23 wherein said reaction mixture is cured by exposure to moisture.

26. The polymer of claim 1 which is capable of being cut by a laser.

\* \* \* \* \*